(12) United States Patent  
Mayr

(10) Patent No.: US 7,984,729 B2  
(45) Date of Patent: Jul. 26, 2011

(54) PROPORTIONAL PRESSURE CONTROL VALVE FOR REGULATING THE PRESSURE LEVEL IN A HYDRAULIC CIRCUIT, PARTICULARLY IN A HYDRAULIC CIRCUIT OF AN AUTOMATED TRANSMISSION

(75) Inventor: Karlheinz Mayr, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 924 days.

(21) Appl. No.: 11/914,323

(22) PCT Filed: Apr. 15, 2006

(86) PCT No.: PCT/EP2006/003493  
§ 371 (c)(1),  
(2), (4) Date: Nov. 13, 2007

(87) PCT Pub. No.: WO2006/119840  
PCT Pub. Date: Nov. 16, 2006

(65) Prior Publication Data  
US 2008/0190487 A1    Aug. 14, 2008

(30) Foreign Application Priority Data  
May 12, 2005  (DE) .................... 10 2005 021 902

(51) Int. Cl.  
*F16K 31/06* (2006.01)
(52) U.S. Cl. .................. 137/596.17; 251/118
(58) Field of Classification Search ........... 137/596.17, 137/596.2; 251/118, 120–122  
See application file for complete search history.

(56) References Cited

U.S. PATENT DOCUMENTS

| 2,237,554 | A  | * | 4/1941  | Grove ........................ 251/122 |
| 3,503,585 | A  | * | 3/1970  | Vogeli ........................ 251/121 |
| 6,328,065 | B1 | * | 12/2001 | Schmid et al. ........... 137/596.17 |
| 6,378,545 | B1 |   | 4/2002  | Bozkan et al. |
| 6,418,967 | B1 |   | 7/2002  | Frei et al. |
| 6,619,615 | B1 |   | 9/2003  | Mayr et al. |
| 6,895,999 | B2 |   | 5/2005  | Fleischer et al. |
| 6,904,934 | B2 |   | 6/2005  | Runge et al. |
| 6,989,729 | B2 |   | 1/2006  | Mayr et al. |
| 2002/0053362 | A1 | | 5/2002 | Frei et al. |

FOREIGN PATENT DOCUMENTS

| DE | 19943066    | 3/2000  |
| DE | 19904901    | 8/2000  |
| DE | 10034959    | 2/2002  |
| DE | 10163235    | 7/2003  |
| DE | 10255414    | 6/2004  |
| WO | 9848332     | 10/1998 |
| WO | 2005026858  | 3/2005  |

* cited by examiner

*Primary Examiner* — Craig M Schneider  
(74) *Attorney, Agent, or Firm* — Leydig, Voit & Mayer, Ltd.

(57) ABSTRACT

A proportional pressure control valve for regulating the pressure level in a hydraulic circuit including a magnet part and a valve part. The valve part includes an inflow opening for the inflow volume flow and two discharge openings. The first discharge opening is for an operating pressure connection and the second discharge opening is for a tank volume flow. The valve part also has a ball seat and a flat seat with an opening. A closing member is operable to control a flow rate through the opening of the flat seat. The valve part also includes a stream deflector disposed between the ball seat and the flat seat that has a circumferential surface configured to deflect a stream filament of the flow by an angle of $\leq 30$ degrees.

10 Claims, 2 Drawing Sheets

PROPORTIONAL PRESSURE CONTROL VALVE FOR REGULATING THE PRESSURE LEVEL IN A HYDRAULIC CIRCUIT, PARTICULARLY IN A HYDRAULIC CIRCUIT OF AN AUTOMATED TRANSMISSION

CROSS REFERENCE TO PRIOR RELATED APPLICATIONS

This is a U.S. National Phase application under 35 U.S.C. §371 of International Application No. PCT/EP2006/003493, filed on Apr. 15, 2006, and claims the benefit of German Patent Application No. 10 2005 021902.0, filed on May 12, 2005. The International Application was published in German on Nov. 16, 2006 as WO 2006/119840 A1 under PCT Article 221(2).

FIELD OF THE INVENTION

The present invention relates to a proportional pressure control valve for regulating the pressure level in a hydraulic circuit, particularly in a hydraulic circuit of an automatic transmission.

BACKGROUND

The pressure in a hydraulic circuit of an automatic transmission can be regulated as a function of the need. Whereas the pressure level in the hydraulic circuit can be kept low for the supply of lubricant oil to the transmission parts, the pressure has to be markedly raised during the gear shifting operations, for example, in order to quickly fill up the shifting elements.

Normally, pressure regulators are used to actuate downstream slide valves that operate shifting elements in order to regulate the pressure in hydraulic circuits. In this process, the downstream slide valves are controlled within the pressure regulator by a proportional magnet including a magnet core, a magnet coil and a magnet armature. The proportional magnet regulates the coil current proportionally to the output quantity; the magnet armature and thus the downstream slide valve for clutch control are regulated in accordance with the coil current. The resultant characteristic magnetic-force current lines of the pressure regulator then serve as the basis for generating the characteristic lines needed to adjust the clutch in an electro-hydraulic control unit of automatic transmissions.

For example, German patent application DE 199 43 066 A1 describes an electromagnetically operated hydraulic proportional valve having a magnet part comprising an electrically controlled coil, a stationary core that protrudes into the coil interior and a sliding armature that is acted upon by the coil and that is coupled to a closing member, and operating channel as well as a valve seat which, while operationally connected to the closing member, regulates a pressure means connection between the operating channel and the return channel. Here, the closing member—at least in the area of its end facing the valve seat—has an essentially conical sealing element whose smaller front surface faces the valve seat, whereby the sealing element has at least one flow-separation edge on its end facing away from the valve seat.

This construction is intended to attain a stable behavior of the proportional valve vis-à-vis temperature effects and flow-related harmonic excitations. The pressure-flow characteristic lines of the proportional valve exhibit a more constant and steady curve in comparison to conventional pressure control valves since the sealing properties and the closing behavior of this proportional valve are improved.

Another proportional pressure control valve that is configured as a pilot valve having a pressure-reduction or pressure-maintenance function is described in German patent application DE 199 04 901 A1 of the applicant. It includes a valve housing with inlet and discharge openings, a control element, an armature rod and a proportional magnet that encompasses a magnet core, a magnet armature and a magnet coil, whereby the proportional magnet displays a virtually constant magnetic force in its operating range. In a holding position of the magnet armature, the smallest axial distance between the magnet armature and the magnet core is dimensioned in such a way that the magnetic force between these two components in the holding position is greater than the magnetic force in the operating range of the proportional magnet, whereby the magnet armature can be secured in this holding position by means of this magnetic force.

Furthermore, German patent application DE 100 34 959 A1 of the applicant describes a proportional pressure control valve having a valve part, with inlet and discharge openings and with at least one closing member that serves to control a diaphragm and one of the openings, as well as having a magnet part with a magnet core, a magnet coil and a sliding magnet armature. An actuation element interacts with the armature and it actuates the closing member, especially at the diaphragm of the inlet opening, whereby the actuation element penetrates at least partially into the diaphragm during the regulation procedure. The hydraulically effective cross section of the diaphragm is essentially determined by the length of the diaphragm, by the diameter of the diaphragm and by the diameter of the part of the actuation element that penetrates into the diaphragm.

In an attempt to attain an optimized flow in the valve part, especially within the range of low temperatures, that is to say, at higher viscosities of the hydraulic fluid, and in order to obtain lower flow resistances, the proportional pressure control valve described in DE 100 34 959 A1 has an optimized configuration of the feed geometry that determines the flow; the length-to-diameter ratio of the diaphragm is selected to be smaller than 2.0 whereby this diaphragm that determines the flow is especially arranged in the admission opening of the valve. As a result, this valve exhibits fewer flow losses, particularly in the case of high oil viscosities, that is to say, at low temperatures; higher flow rates and shorter response times of the valve are achieved, so that this proportional pressure control valve permits better dynamic values.

A specific proportional pressure control valve having a magnet part and a valve part is described herein, whereby the valve part is provided with an inlet opening for the inlet volume flow, with a first discharge opening for the filling volume flow and with a second discharge opening for the tank volume flow, and having a ball seat, a flat seat provided with an opening, a closing member to control the flow rate through the opening in the flat seat and having a stream deflector arranged between the ball seat and the flat seat.

In this control valve the inflow opening for the inflow volume flow is configured at the front end of the valve part facing away from the magnet part and coaxially to the valve part; it is also provided that the discharge opening for the filling volume flow for the coupling to the side wall of the valve part is configured radially to the longitudinal axis of the valve part in such a way that fluid particles flowing from the inflow opening to the discharge opening are subject to a deflection of 90° at the maximum, and that the axial distance of the stream deflector from the ball seat as well as the diameter, the wall thickness and the shape of the stream deflector are all selected in such a manner that, after the fluid particles flow through the ball seat, they flow to and through the stream deflector and are subject to a deflection of less than 30°.

In automatic transmissions, especially in automatic transmissions of automobiles, primarily hydrodynamic converters are employed as the starting element. Particularly when the transmission oil is cold, the energy requirement of the converter is very high, as a result of which the starting behavior of the vehicle is adversely affected. By the same token, the response of the gear shifting elements in the minus temperature range is likewise delayed, which is also detrimental.

SUMMARY

An aspect of the present invention is to provide a proportional pressure control valve to regulate the pressure level in a hydraulic circuit by means of which an increase can be achieved in the dynamic regulation capacity of power-shift clutches, especially the starting clutch in an automatic transmission, without making use of a hydrodynamic starting element.

In particular, the increase in the cut-off frequency, for instance, of the system consisting of the pressure-control element and of a wet starting clutch, may account, on the one hand, for a comfort start at minus temperatures similar to that of gears comprising a hydrodynamic converter and, on the other hand, the power shifts may take place more spontaneously, that is to say, perceptibly more directly.

Accordingly, the present invention provides a proportional pressure control valve for regulating the pressure level in a hydraulic circuit including a magnet part and a valve part. The valve part includes an inflow opening for the inflow volume flow and two discharge openings. The first discharge opening is for an operating pressure connection and the second discharge opening is for a tank volume flow. The valve part also has a ball seat and a flat seat with an opening. A closing member is operable to control a flow rate through the opening of the flat seat. The valve part also includes a stream deflector disposed between the ball seat and the flat seat that has a circumferential surface configured to deflect a stream filament of the flow by an angle of $\leq 30$ degrees.

BRIEF DESCRIPTION OF THE DRAWINGS

Exemplary embodiments of the invention will be described in greater detail below with respect to the accompanying drawings, in which.

DETAILED DESCRIPTION

In an embodiment, the present invention provides a proportional pressure control valve comprising a magnet part and a valve part, whereby the valve part has an inlet opening for the inlet volume flow, a first discharge opening for the operating pressure connection, a second discharge opening for the tank volume flow, a ball seat, a flat seat provided with an opening, a closing member to control the flow rate through the opening of the flat seat and a stream deflector arranged between the ball seat and the flat seat, whereby the stream deflector runs symmetrically along the longitudinal axis of the proportional pressure control valve, and having a body with the geometry of an envelope of cone, whereby the body is joined to the valve part via webs.

The diameter of the stream deflector may be $\leq 1.25$ NW, wherein NW stands for the nominal width, which is defined as the diameter of the opening of the flat seat.

Moreover, the stream deflector can be arranged between the ball seat and the flat seat in such a fashion that the positioning distance v to the ball seat outlet is $\geq 0.5$ NW and the positioning distance h to the ring flow inlet is $\geq 0.3$ NW.

According to an embodiment of the invention, owing to the fact that the geometry of the body is like an envelope of cone and owing to the interaction with the positioning distances v and h, the stream deflector acts in such a way that the difference of the angles $\alpha$ and $\beta$ between the projection lines from the vertex of the stream deflector towards the inflow or outflow edges and the middle flow axis in the area of the stream deflector is less than 3° and a good flow symmetry is created vis-à-vis the normals along the middle flow axis in the area of the stream deflector.

According to an embodiment of the invention, the stream deflector is configured and positioned in such a way that the approaching angle relative to the longitudinal axis of the valve is $\leq 60°$. Here, the edges of the stream deflector can have a rounded shape, with a curvature radius in the order of magnitude of 0.1 NW or more.

The outflow edges on the ring flow inlet can be rounded or sharp-edged, whereby a curvature radius on the order of magnitude of 0.1 NW or more is selected for rounded edges.

Due to the low flow-loss and symmetrical configuration of the stream deflector of the invention, it is possible to obtain a flow that is eddy-free or that runs around the stream deflector.

Figure 1:
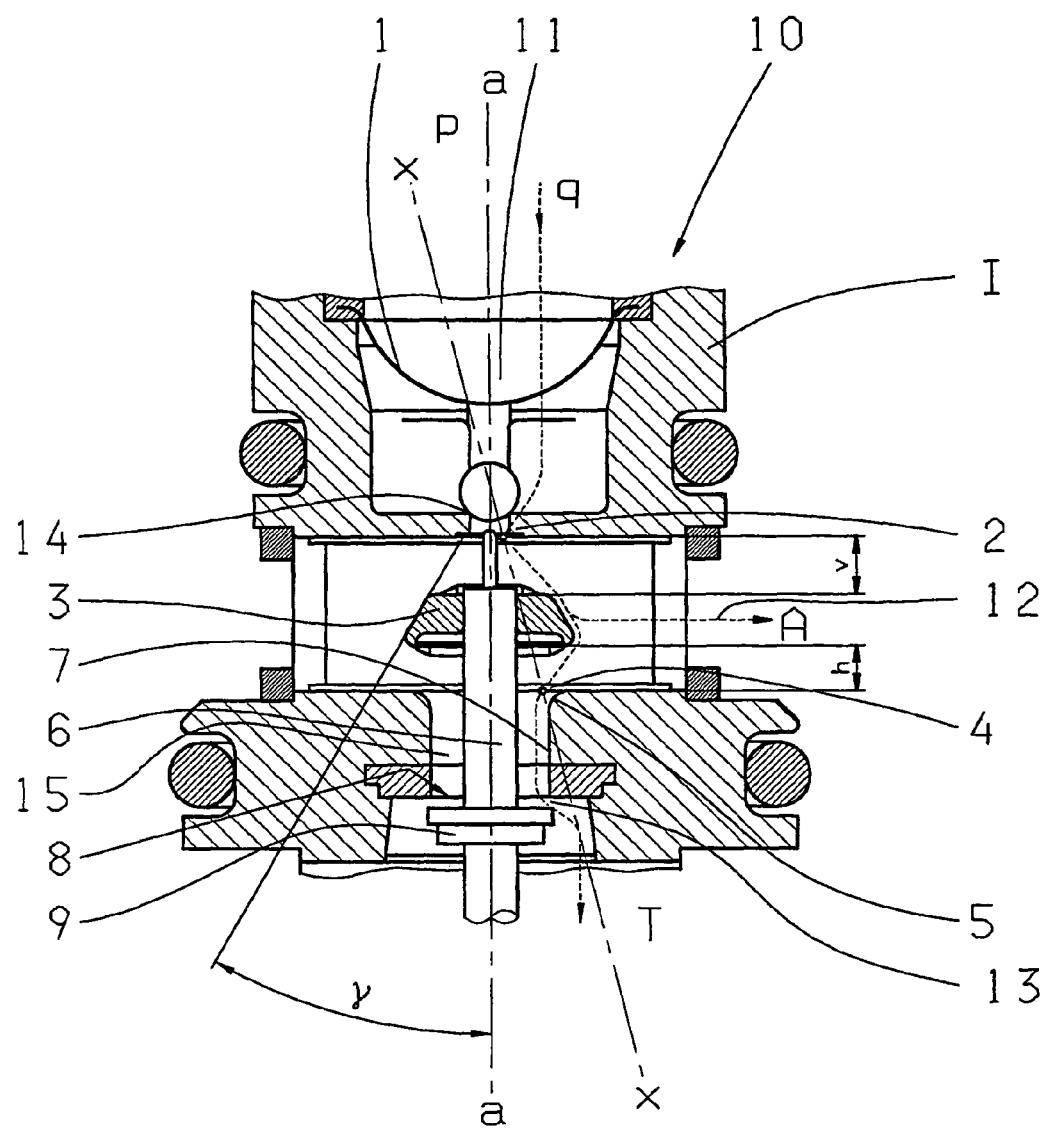
FIG. 1 is a schematic sectional view of a proportional pressure control valve according to the invention.
Figure 2:
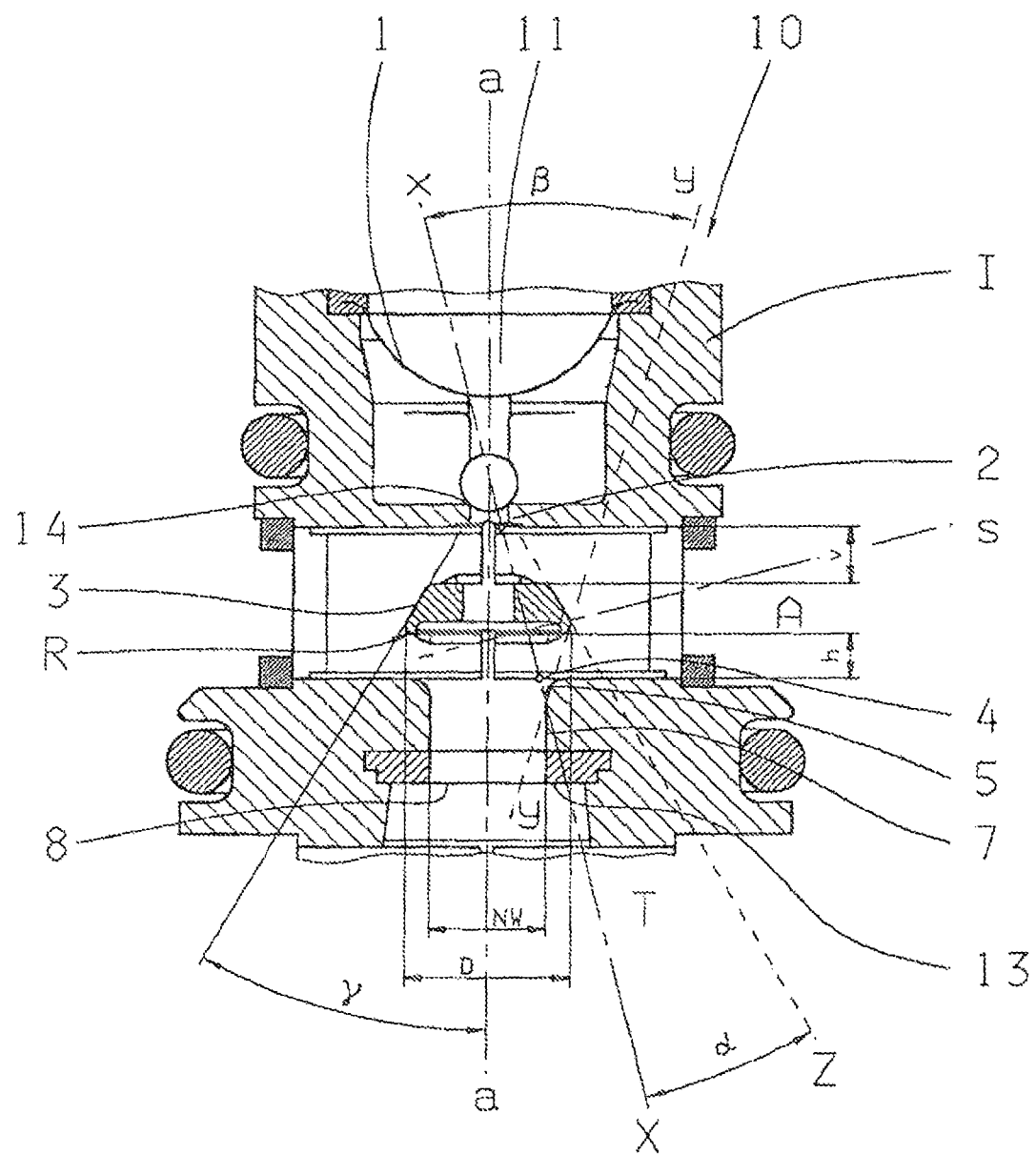
FIG. 2 is a schematic sectional view of the proportional pressure control valve according to the invention as shown in FIG. 1, showing the approach angle $\gamma$ relative to the longitudinal axis of the valve as well as the angles $\alpha$ and $\beta$ of the projection lines z, y from the vertex of the stream deflector to the inflow or outflow edges.

FIGS. 1 and 2 show a proportional pressure control valve 10 comprising a magnet part and a valve part, whereby the valve part has an admission opening 11 for the admission volume flow whose admission pressure is designated by the letter P, a first discharge opening 12 for the operating pressure connection A, a second discharge opening 13 for the tank volume flow to the tank T, a ball seat 14, a flat seat 8 provided with an opening 15, a closing member 9 that serves to control the flow rate through the opening 15 of the flat seat 8 and a stream deflector 3. Furthermore, a filter sieve 1 is provided upstream from the admission opening 11.

According to the figure, the stream deflector 3 is arranged between the ball seat 14 and the flat seat 8. The circumferential surface of the stream deflector 3 is configured such that the angle $\gamma$ by which the stream filament q is deflected in the direction of flow is $\leq 30°$.

In an embodiment, the stream deflector (3) is configured rotation-symmetrically around a longitudinal axis a-a of the valve. The circumferential surface of the stream deflector has the form of a truncated cone, whereby the stream deflector is joined to the valve part via webs.

In another embodiment, the cross section of the stream deflector has the shape of a trapezoid. The stream deflector here is not rotationally symmetrical but rather, it extends perpendicular to the direction of flow and is joined directly to the valve part.

The stream filament q will, on the one hand, run from the ball seat 2 around the stream deflector 3 after the deflection in the direction of the operating pressure connection A and, on the other hand, will form in the direction of the ring flow inlet 4 between the plunger 6 and the wall 7 in the direction of the flat seat 8 through the flange part I of the proportional pressure control valve 10.

By way of example, the reference numeral 5 designates an outflow edge at the ring flow inlet 4. As shown in the figure, it can have a rounded shape, whereby a curvature radius in the order of magnitude of 0.1 NW or more has proven to be particularly advantageous. As an alternative to this, the outflow edges can be sharp-edged.

As can be seen in FIG. 2, the angle γ by which the stream filament is deflected in the direction of flow is ≦30. Here, the edges of the stream deflector 3 are rounded, the radius of curvature R being in the order of magnitude of 0.1 NW or more.

The stream deflector 3 is arranged between the ball seat 14 and the flat seat 8 in such a manner that the positioning distance v to the ball seat outlet 2 is ≧0.5 NW and the positioning distance h to the ring flow inlet 4 is ≧0.3 NW. These positioning distances, in conjunction with the envelope-of-cone geometry of the body of the stream deflector 3, account for the fact that the difference of the angles α and β between the projection lines z and y from the vertex of the stream deflector 3 towards the inflow or outflow edges and towards the middle flow axis x-x in the area of the stream deflector is less than 3° and a good flow symmetry is achieved relative to the normal s along the middle flow axis x-x in the area of the stream deflector. In one embodiment, the angles α and β are ≦23°.

The angles α and β as well as the normal s have been drawn in FIG. 2. Moreover, FIG. 2 shows the diameter D of the stream deflector 3 which, according to the invention, is ≦1.25 NW.

Naturally, any and all technically useful design embodiments, especially any spatial arrangement of the components of the proportional pressure control valve according to the invention in and of themselves as well as with respect to each other, fall under the protective scope of the invention, without affecting the function of the proportional pressure control valve as set forth in the claims, even if such embodiments have not been explicitly depicted in the figures or presented in the description.

The invention claimed is:

1. A proportional pressure control valve for regulating the pressure level in a hydraulic circuit, comprising:
   a magnet part; and
   a valve part, the valve part including:
      an inflow opening for inflow volume flow;
      a first discharge opening for an operating pressure connection;
      a second discharge opening for a tank volume flow;
      a ball seat;
      a flat seat including an opening;
      a closing member operable to control a flow rate through the opening of the flat seat: and
      a stream deflector disposed between the ball seat and the flat seat, the stream deflector comprising a circumferential surface configured to deflect a stream filament flowing from an outlet of the ball seat to a vertex of the circumferential surface of the stream deflector by an angle of ≦30 degrees.

2. The proportional pressure control valve as recited in claim 1 wherein the stream deflector has a shape of a truncated cone that is rotationally symmetric about a longitudinal axis of the valve, and wherein the stream deflector is attached on the valve part by webs.

3. The proportional control valve as recited in claim 1 wherein a cross section of the stream deflector has a shape of a trapezoid, and wherein the stream deflector is disposed perpendicular to a flow direction.

4. The pressure control valve as recited in claim 1 wherein a diameter of an opening of the flat seat defines a nominal width NW, and wherein an edge of the stream deflector includes a radius of curvature of about 0.1 NW.

5. The proportional pressure control valve as recited in claim 1 wherein a diameter of an opening of the flat seat defines a nominal width NW, wherein a positioning distance between the stream deflector and the ball seat is at least 0.5 NW, and wherein a positioning distance between the stream deflector and a ring flow inlet is at least 0.3 NW.

6. The proportional pressure control valve as recited in claim 1 wherein a diameter of an opening of the flat seat defines a nominal width NW, and wherein an outer diameter of the stream deflector is not greater than 1.25 NW.

7. The proportional pressure control valve as recited in claim 1 wherein a diameter of an opening of the flat seat defines a nominal width NW, and wherein outflow edges of a ring flow inlet are rounded with a radius of curvature about 0.1 NW.

8. The proportional pressure control valve as recited in claim 1 wherein a diameter of an opening of the flat seat defines a nominal width NW, and wherein outflow edges of a ring flow inlet are sharp.

9. The proportional control valve as recited in claim 1 further comprising:
   a middle flow axis extending from an inflow edge to an outflow edge,
   a first projection line from a vertex of the stream deflector to the inflow edge, and
   a second projection line from the vertex of the stream deflector to the outflow edge,
   a first angle between the middle flow axis and the first projection line, and
   a second angle between the middle flow axis and the second projection line, and
   wherein a difference between the first angle and the second angle is less than 3 degrees.

10. The proportional control valve as recited in claim 1 further comprising:
   a middle flow axis extending from an inflow edge to an outflow edge,
   a first projection line from a vertex of the stream deflector to the inflow edge, and
   a second projection line from the vertex of the stream deflector to the outflow edge,
   a first angle between the middle flow axis and the first projection line, and
   a second angle between the middle flow axis and the second projection line, and
   wherein the first and second angles are not more than 23 degrees.

* * * * *